United States Patent [19]

Lindholm et al.

[11] Patent Number: 5,765,157
[45] Date of Patent: Jun. 9, 1998

[54] COMPUTER SYSTEM AND METHOD FOR EXECUTING THREADS OF EXECUTION WITH REDUCED RUN-TIME MEMORY SPACE REQUIREMENTS

[75] Inventors: Timothy G. Lindholm, Palo Alto, Calif.; William N. Joy, Aspen, Colo.

[73] Assignee: Sun Microsystems, Inc., Palo Alto, Calif.

[21] Appl. No.: 658,501

[22] Filed: Jun. 5, 1996

[51] Int. Cl.[6] .............................. G06F 12/06; G06F 13/00
[52] U.S. Cl. ........................ 707/101; 707/205; 707/206; 711/113; 711/160; 341/51; 341/79
[58] Field of Search .................................. 707/101, 205, 707/206; 341/79, 51; 711/113, 160

[56] References Cited

U.S. PATENT DOCUMENTS

| | | | |
|---|---|---|---|
| 5,446,740 | 8/1995 | Yien et al. | 370/110.1 |
| 5,450,562 | 9/1995 | Rosenberg et al. | 395/446 |
| 5,479,587 | 12/1995 | Campbell et al. | 395/116 |
| 5,483,622 | 1/1996 | Zimmerman et al. | 395/114 |
| 5,534,861 | 7/1996 | Chang et al. | 341/79 |
| 5,559,978 | 9/1996 | Spilo | 395/413 |
| 5,572,209 | 11/1996 | Farmer et al. | 341/67 |
| 5,638,498 | 6/1997 | Tyler et al. | 395/117 |

*Primary Examiner*—Thomas G. Black
*Assistant Examiner*—Jean R. Homere
*Attorney, Agent, or Firm*—Stephen M. Knauer; Flehr Hohbach Test Albritton & Herbert LLP

[57] ABSTRACT

A computer system and associated method for executing a plurality of threads of execution with reduced memory space requirements. The computer system comprises a memory, an execution controller, and a data compressor. The execution controller controls execution of the threads such that the threads are executable and unexecutable at different times. The execution controller also stores uncompressed into available space in the run-time memory execution data of the threads when the execution data is generated. The data compressor compresses the uncompressed execution data of compressible ones of the threads that are unexecutable. As a result, space is made available in the run-time memory. The data compressor also decompresses in available space in the run-time memory the compressed execution data of decompressible ones of the threads so that the decompressible ones of the threads may be executed after becoming executable.

27 Claims, 5 Drawing Sheets

COMPUTER SYSTEM AND METHOD FOR EXECUTING THREADS OF EXECUTION WITH REDUCED RUN-TIME MEMORY SPACE REQUIREMENTS

The present invention relates to computer systems and methods for executing programs in a multi threaded environment with reduced run-time memory space requirements. In particular, the present invention pertains to computer systems and methods for executing threads of execution where the execution data of the threads is compressed when the threads are unexecutable so as to reduce memory space requirements.

BACKGROUND OF THE INVENTION

Computer systems are now being built or configured to take advantage of properties of programs whose code is in an architecture neutral (AN) binary format, hereinafter referred to as AN code. Thus, the AN code of these programs is independent of the specific architecture or platform of the computer system.

The term architecture is defined for the purposes of this document to mean the operating characteristics of a family of computer models. Examples of specific architectures include Macintosh computers, IBM PC compatible computers using the DOS or Windows operating systems, Sun Microsystems computers running the Solaris operating system, and computer systems using the Unix operating system.

The term architecture specific (AS) is defined for the purposes of this document to refer to the requirement that the code of certain programs be in a binary format, hereinafter referred to AS code, for execution only on computer systems with a specific computer architecture. Thus, programs with code written in a conventional programming language (e.g., 80486 assembler language) and compiled for a specific architecture (e.g., IBM compatible PC) can only run on that architecture or emulators of that architecture.

The term architecture neutral (AN) is defined for the purposes of this document to refer to programs whose compiled code can be executed on a variety of computer systems with different architectures. For example, a computer system with a specific architecture can be configured with a Java (a trademark of Sun Microsystems) virtual machine module. The Java virtual machine module enables execution of programs with code written in the Java programming language and compiled into bytecode, hereinafter referred to as Java bytecode, for the instruction set of the Java virtual machine. Java bytecode is independent of the specific architecture of the computer system.

Important features of programs with AN code include their portability. For example, since programs in AN code can be executed on any computer system configured to execute the AN code regardless of the computer system's specific architecture, these programs can be easily transported over a network from one computer system to another. For example, programs compiled into Java bytecode can be executed on any computer system with a Java virtual machine module and can be easily transported over a network from one computer system to another using a HotJava (a trademark of Sun Microsystems) network communications manager.

Furthermore, another important feature related to the portability of programs compiled into Java bytecode is the verifiability of such programs. Specifically, the Java virtual machine module can easily verify that these programs satisfy predefined integrity criteria. Such integrity criteria include stack and data type usage restrictions that ensure that Java bytecode cannot overflow or underflow the Java virtual machine module's stack and that all instructions in Java bytecode utilize only data whose data type matches the data type restrictions for those instructions. As a result, a program in Java bytecode cannot forge object pointers and generally cannot access system resources other than those which the user has explicitly granted it permission to use.

For these reasons, computer systems are being configured for execution of programs compiled into AN code that are received over a network. In fact, in some cases, such computer systems may not even require a secondary memory (e.g., a hard disk) since the programs are loaded directly into the run-time (i.e., execution-time) memory (e.g., random access memory (RAM)) of the computer system. As a result, the user of such a computer system is freed from the cycle of software purchase, installation, configuration and upgrade that is currently typical of software products.

Furthermore, many software programs (i.e., applications) may be executed with multiple threads of execution. Threads can be used to make programs more responsive, run faster, etc.

In view of the foregoing, multi threaded programs in AN code are particularly attractive for use in inexpensive computer systems that are networked and are loaded with the AN code on demand. For example, these kinds of computer systems may be video games, personal digital assistants (PDAs), cellular phones, or other similar computer systems or computer operated devices.

For such computer systems, low price is extremely important. In practice, one of the most significant costs in building such computer systems is the amount of run-time (i.e., run-time) memory that is required to run the software infrastructure and programs. This is to be distinguished from the static memory which is needed for storing the code of the software infrastructure and programs. It is very important to reduce the amount of run-time memory required by the kinds of computer systems just discussed since such a reduction produces a strong competitive advantage.

Specifically, in multi threaded environments, a thread is typically implemented in part using one or more private areas (i.e., ranges) of run-time (i.e., run-time) memory to store the execution data needed to execute the thread. These private areas are typically in the form of stacks, heaps, or individual thread-local variables and represent the run-time storage cost of the thread. Thus, the run-time storage cost of a program is the sum of the run-time storage costs of all of its threads while the static storage cost of the program is the amount of memory used to store its code. Thus, it is desirable to reduce the average run-time storage cost of each thread in order to reduce the storage requirements of a computer system needed to support a program.

SUMMARY OF THE INVENTION

In summary, the present invention is a computer system and associated method for executing a plurality of threads of execution with reduced run-time memory space requirements. The computer system comprises an run-time memory, an execution controller, and a data compressor.

The execution controller controls execution of the threads such that the threads are executable and unexecutable at different times. The execution controller also stores uncompressed in available space in the run-time memory execution data of the threads when the execution data is generated.

The data compressor compresses the uncompressed execution data or portions thereof of compressible ones of the threads that are unexecutable. As a result, space is made available in the run-time memory. The data compressor also decompresses in available space in the run-time memory the compressed execution data or portions thereof of decompressible ones of the threads whose execution data is compressed so that the decompressible ones of the threads may be executed when they become executable.

In one embodiment, the data compressor decompresses the compressed execution data of the decompressible ones of the threads as soon as they become executable.

In another embodiment, the data compressor decompresses the compressed execution data of the decompressible ones of the threads after a predetermined time interval.

In yet another embodiment, the data compressor compresses the uncompressed execution data of the compressible ones of the threads as soon as they become unexecutable.

In still another embodiment, the data compressor compresses the uncompressed execution data of compressible ones of the threads when space in the run-time memory is needed but not available. In this embodiment, the computer system may further comprise a least recently executed list that lists those of the threads that are currently unexecutable in order of least recently executed thread to most recently executed thread. The compressible ones of the threads are the least recently executed threads in the least recently executed list with uncompressed execution data when space in the run-time memory is needed but not available.

In a further embodiment, the computer system also comprises a secondary memory. In this embodiment, the data compressor stores in the secondary memory the compressed execution data or portions thereof of storable ones of the threads that are unexecutable when space in the run-time memory is needed but not available. The data compressor then retrieves from the secondary memory the compressed execution data or portions thereof of retrievable ones of the threads whose compressed execution data is to be decompressed in the run-time memory.

BRIEF DESCRIPTION OF THE DRAWINGS

Additional goals and features of the invention will be more readily apparent from the following detailed description and appended claims when taken in conjunction with the drawings, in which:

DESCRIPTION OF THE PREFERRED EMBODIMENTS

Figure 1:
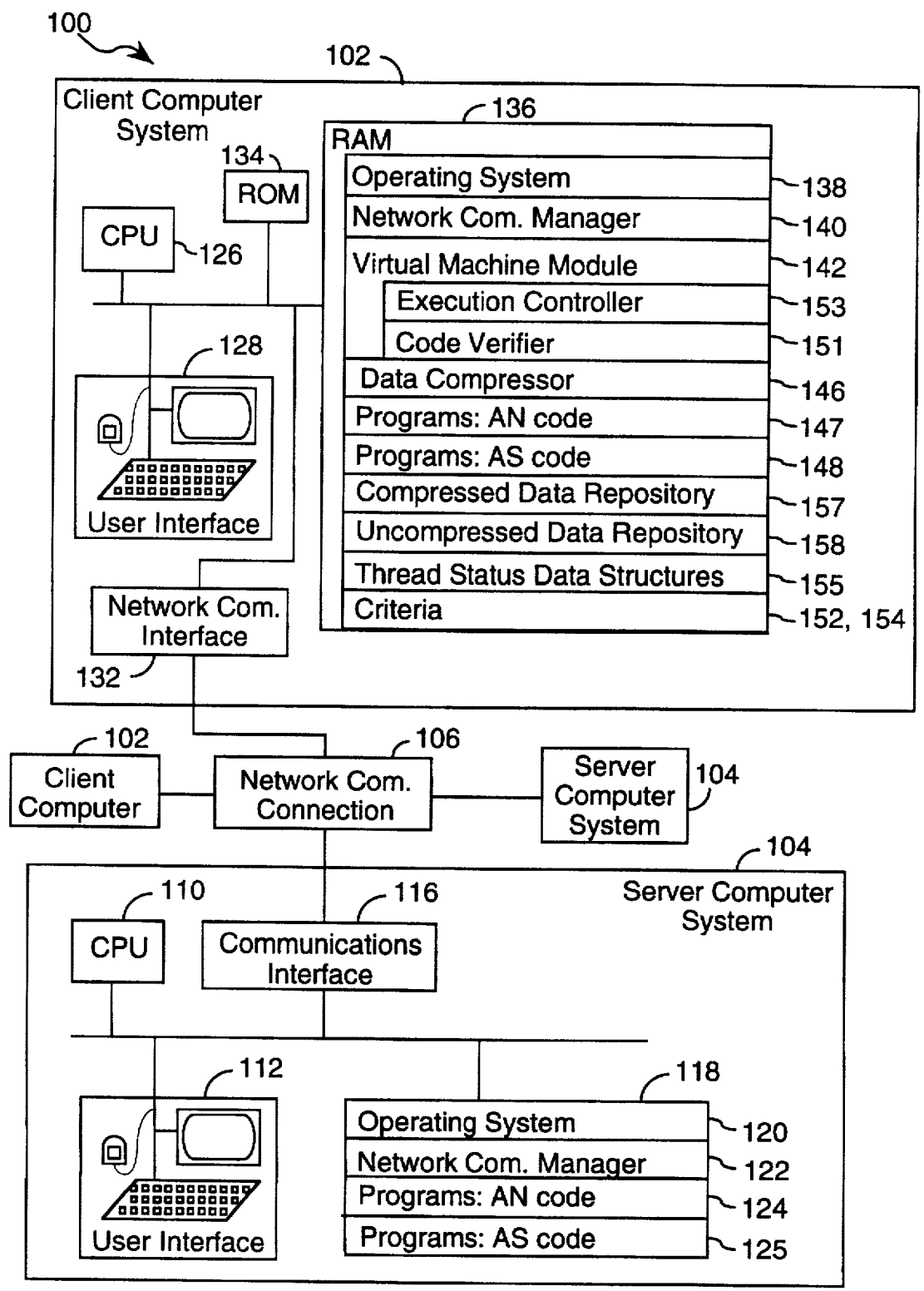
FIG. 1 is a block diagram of a computer network incorporating the present invention.

Referring to FIG. 1, there is shown a computer network 100 in accordance with the present invention. It includes one or more client computer systems 102, one or more server computer systems 104, and a network communications connection 106.

The client computer systems 102 are connected to the server computer systems 104 via the network communications connection 106. The network communications connection may be a local or wide area network, the Internet, or some other type of network communications connection.

Each server computer system 104 includes a central processing unit (CPU) 110, a user interface 112, a network communications interface 116, and a memory 118. The network communications interface enables each server computer system to communicate with the client computer systems 102 via the network communications connection 106.

The memory 118 of each server computer system 104 stores an operating system 120, a network communications manager (or server) 122, and multi threaded programs (i.e., methods) 147 and/or 148. The operating system and communications manager are all run on the CPU 120. The operating system controls and coordinates running of the network communications manager in response to commands issued by a user with the user interface 112 or received by the network communications interface 116 via the network communications connection 106 from users of the client computer systems 102.

The programs 147 of each server computer system 104 contain architecture neutral (AN) code that is independent of the specific architecture (i.e., platform) of the client computer systems 102. These programs are compiled from a specific programming language into the AN code. In the preferred embodiment, these programs are written in the Java programming language and compiled into Java bytecode. Moreover, these programs are included in object classes that form software applications programmed in an object-oriented manner.

Unlike the programs 147, the programs 148 of each server computer system are compiled into architecture specific (AS) code for the specific architecture of the client computer systems 102. As will be explained in greater detail later, it is preferred that the network 100 be a closed and trusted network in which these programs may be securely shipped to the client computers 102 with a high degree of confidence or that these programs have embedded digital signatures which can be verified.

As will be explained in more detail later, the programs 147 and/or 148 are transmitted upon user request to the client computer systems 102 using the network communications manager 122. Thus, the code of these programs is considered network mobile code.

Each client computer system 102 may be a video game, a personal digital assistant (PDA), a cellular phone, desktop computer, or other computer system or computer operated device which requires a small amount of run-time memory. Furthermore, each client computer system includes a central processing unit (CPU) 126, a user interface 128, a network communications interface 132, a read only memory (ROM) 134, and a run-time random access memory (RAM) 136. The network communications interface enables the client computer system to communicate with the server computer systems 104 via the network communications connection 106.

The RAM 136 of each client computer system 102 stores an operating system 138, a network communications manager 140, a virtual machine module 142, and a data compressor 146 that have all been loaded from the ROM 134. The RAM also stores the programs 147 in AN code and programs 148 in architecture specific (AS) code that have been downloaded from the server computers 104. The operating system, network communications manager, virtual machine module, the data compressor, and programs are all executed on the CPU 126. The operating system controls and coordinates execution of the network communications manager, virtual machine module, the data compressor, and programs in response to commands issued by a user with the user interface 128.

As alluded to earlier, the programs 147 and/or 148 are received from the server computer systems 104 upon user request. These programs are obtained using the network communications manager 140 which is, in the preferred embodiment, a HotJava network communications manager. The network communications manager then loads these programs in the RAM 136.

In the case of the loaded programs 147 in AN code, the code verifier 151 of the virtual machine module 142 then verifies that the AN code of the loaded programs meets predefined integrity criteria. As mentioned earlier, this may include stack and data type usage restrictions to ensure that loaded programs cannot overflow or underflow the virtual machine module's stack and that all program instructions utilize only data whose data type matches the data type restrictions for those program instructions.

However, in the case of the loaded programs 148 with AS code, the code verifier 151 cannot be used to directly verify their integrity. Thus, to verify their integrity indirectly, the network 100 may be a closed and trusted network in which these programs may be securely shipped to the client computers 102 with a high degree of confidence. Alternatively, if the network 100 is not secure, these programs may have embedded digital signatures which enable the network communications manager 140 to verify that they are from a trusted source.

The execution controller 153 of the virtual machine module 142 controls execution of the programs 147 and/or 148 when they are loaded. In particular, the execution controller interprets the AN code of the programs 147 for execution on the specific architecture of the client computer system 102 and enables these programs to call the programs 148 with AS code to be executed on the specific architecture. In addition, if the network communications manager 140, and/or data compressor 146 are themselves compiled into AN code, then the execution controller controls execution of them as well.

Since the just loaded programs 147 and/or 148 are multi threaded, the execution controller 153 creates threads of execution for these programs. The execution of these threads, along with the threads of any other loaded programs 147 and/or 148, is controlled by the execution controller.

The virtual machine module 142 is compiled into the AS code for the specific architecture of the client computer system 102. The virtual machine module may be a Java virtual machine module written in the C language and compiled into the AS code.

Furthermore, in order to keep the RAM space requirements of the client computer systems 102 low, the data compressor 146 compresses and decompresses in the RAM 136 the execution data of the threads at various times during their execution. The execution data of each thread is stored in a uncompressed data repository 158 in the RAM when it is uncompressed and in a compressed data repository 157 in the RAM when it is compressed. The execution and storage status of the threads is maintained in the thread execution and storage status data structures 155. The execution data of the threads is compressed and decompressed for threads that are respectively compressible and decompressible because they satisfy predefined compression and decompression criteria 152 and 154 stored in the RAM 136. In some embodiments of the present invention, the compression and decompression criteria, which are more fully described later, are user selectable and/or tunable (using user interface 128) from a set of predefined memory management strategies.

In the preferred embodiment, the predefined compression criteria 152 specifies that the execution data of a compressible thread be compressed at the time when (1) space in the RAM 136 is needed but not available, and (2) the compressible thread is the least recently executed of the threads that has not yet had its execution data compressed. Also, in the preferred embodiment, the predefined decompression criteria 154 for decompressing a decompressible thread's execution data simply specifies that the execution data of the decompressible thread is compressed and is to be decompressed at the time when the decompressible thread has become executable.

Figure 2:
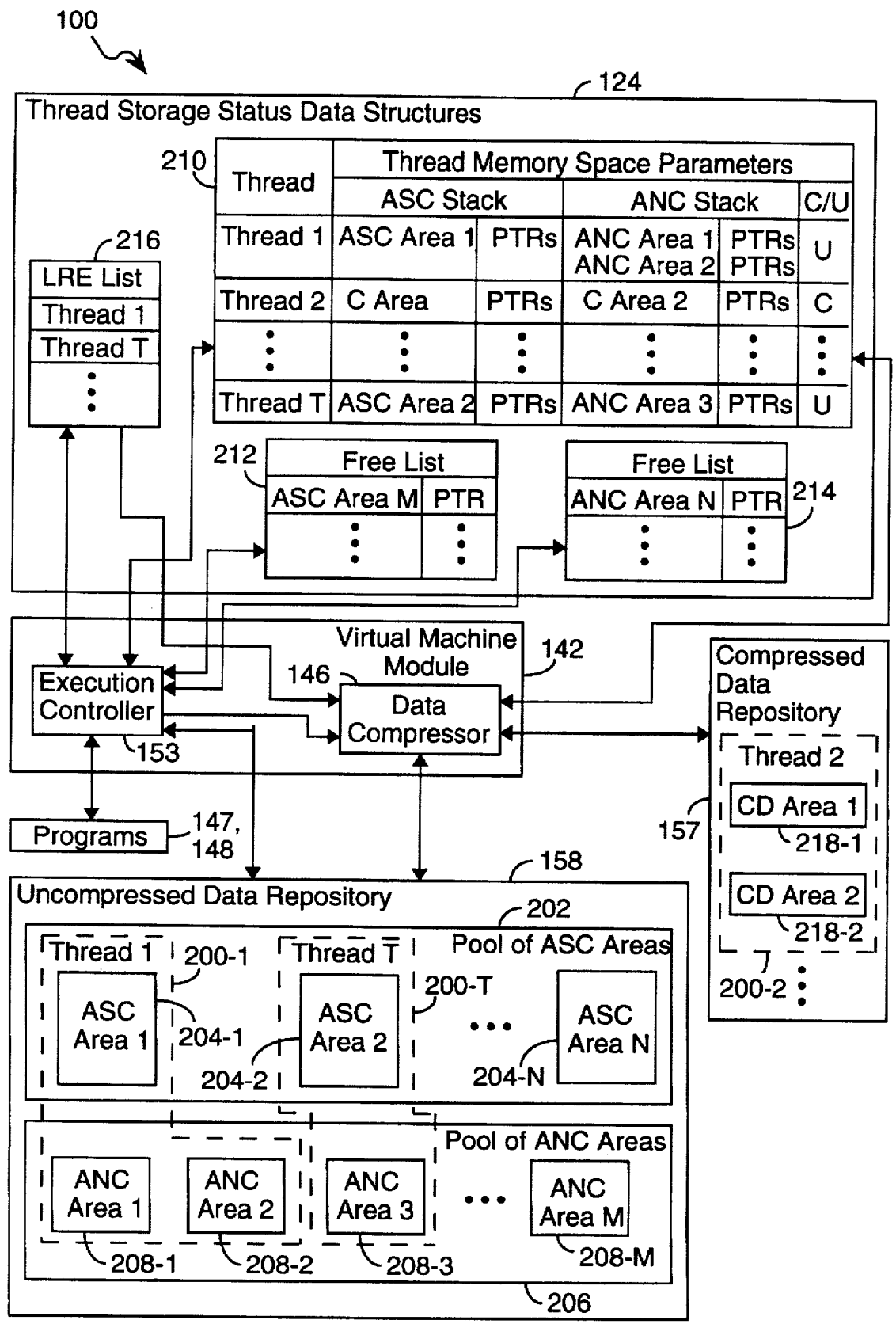
FIG. 2 is a functional block diagram of the operation of a client computer system in the computer network.

Referring to FIG. 2, each of the threads 200 is implemented by the execution controller 153 with an AS code (ASC) stack and an AN code (ANC) stack. Specifically, the execution controller stores in the ASC stack execution data for executing its AS code so that it can control execution of the thread. Similarly, the execution controller stores in the ANC stack execution data for executing the ANC code of the thread and any AS code called by the AN code. In the case where the virtual machine module 142 is written in the C language and compiled to the AS code, each ASC stack may be a fixed size contiguous stack (e.g., 128K), as is typically done in implementations of programs written in C. Moreover, in the case where the programs 147 are compiled into Java bytecode, the ANC stack is a variable size non-contiguous Java stack that is expanded and contracted (e.g., at least 4K and increased or decreased in 4K increments) depending on RAM space requirements.

To create the ASC and ANC stacks of each of the threads 200, the uncompressed data repository 158 includes a pool 202 of ASC memory areas 204 and a pool 206 of ANC memory areas 208. Moreover, the thread storage status data structures 155 include a thread storage status table 210, a free list 212 of the ASC memory areas 204, and a free list 214 of the ANC memory areas 208. The free lists respectively list those of the ASC and ANC memory areas that are available (i.e., free) and the corresponding pointers to the available memory areas.

Figure 3:
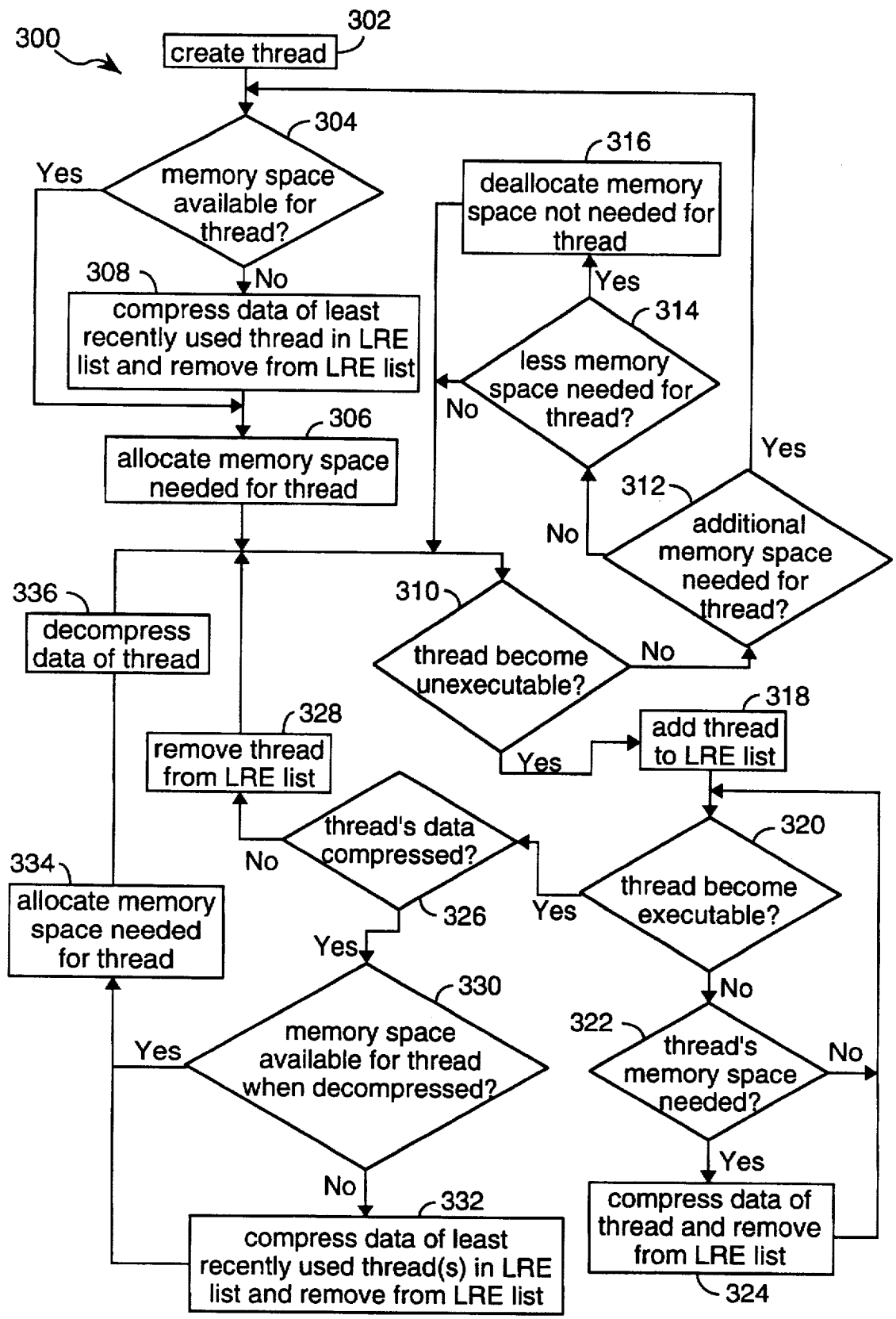
FIG. 3 is a flow chart of the operation of the client computer system.

FIG. 3 shows a flow chart of the compression and decompression method 300 of the present invention in accordance with the preferred compression and decompression criteria 152 and 154 described earlier. Referring to FIGS. 2 and 3, when one of the threads 200 is created by the execution controller 153 (step 302 of FIG. 3), it determines whether there is available memory space in the uncompressed data repository 158 to implement the thread (step 304 of FIG. 3). This is done by determining from the free lists 212 and 214 if there is an available ASC memory area 204 and an available ANC memory area 208.

If the memory space is available, then the execution controller 153 allocates the memory space and stores in it uncompressed execution data to implement the thread 200 at the time when the uncompressed execution data is generated (step 306 of FIG. 3). In other words, if both an ASC memory area 204 and an ANC memory area 208 are available, then the execution controller allocates the available ASC and ANC memory areas as the ASC and ANC stacks of the thread and stores in them the uncompressed execution data of the thread. In doing so, the execution controller updates the thread storage status table 210 to identify the thread, the allocated ASC memory area that forms the ASC stack, and the allocated ANC memory area that forms the ANC stack. In addition, the execution controller updates the thread storage status table to identify the pointers to the ASC and ANC memory areas which respectively serve as the pointers to the bottoms of the ASC and ANC stacks. Similarly, the execution controller updates the thread storage status table to identify the pointers to the ends of the execution data in the ASC and ANC memories which respectively serve as the pointers to the tops of the ASC and ANC stacks. The allocated ASC and ANC memory areas therefore together provide the memory space of the thread. The execution controller also updates the thread storage status table to indicate that the execution data in the thread's memory space is uncompressed (U) and removes the allocated ASC and ANC memory areas from the corresponding free lists.

Each of the threads 200 may be executable (i.e., usable or runnable) and unexecutable at various times. A thread may not be currently executable because it has been put to sleep, is waiting for data, is descheduled, etc. The thread status data structures 155 include an LRE list 216 that lists each thread that is currently not executable. The LRE lists the threads in order from least recently executed to most recently executed.

However, if memory space in the uncompressed data repository 120 is not available to implement the thread 200, then the execution controller 153 invokes the data compressor 146. The data compressor compresses the execution data of the least recently executed thread listed in the LRE list and places it in the compressed data repository 157 (step 308 of FIG. 3). Specifically, the compressed execution data in the ASC and ANC memory areas identified in the thread storage status table 210 as being allocated to the thread are placed in corresponding compressed data (CD) memory areas 218 in the compressed data repository 157. The data compressor also updates the thread storage status table to identify the corresponding CD memory areas that form the ASC and ANC stacks of the thread, the corresponding pointers to CD memory areas, and the corresponding pointers to the ends of the compressed execution data in the CD memory areas. It also updates the thread storage status table to indicate that the memory space of the thread has been compressed (C). The data compressor 146 may use any fast data compression technique well known to those skilled in the art.

While the created thread 200 is executable, the execution controller 153 places on and removes from the ASC and ANC stacks at appropriate times uncompressed execution data that is generated during execution. In doing so, the execution controller updates the pointers to the tops of the ASC and ANC stacks correspondingly.

Moreover, while this occurs (step 310 of FIG. 3), the execution controller 153 increases the size of the thread's memory space (steps 304-308) when the thread requires more memory space during execution (step 312 of FIG. 3) in a similar manner to that described earlier for allocating memory space to a created thread. Specifically, each time the thread requires additional memory space to store execution data for running the thread in the architecture neutral language, the size of the ANC stack must be increased by allocating another portion of the uncompressed data repository 120 to it. In doing this, the execution controller allocates another ANC memory area 208 listed in the free list 212 to the thread by updating the thread storage status table 210 to identify the allocated ANC memory area as being part of the ANC stack, identify a pointer to the allocated ANC memory area, and identify a pointer to the end of the execution data in the allocated ANC memory area which serves as the pointer to the top of the ANC stack. In addition, the execution controller removes the allocated ANC memory area from the free list (or decreases its size if only a portion of an available ANC memory area was allocated to the thread).

Similarly, while the thread 200 is executable (step 310 of FIG. 3), each time that it no longer requires a portion of its memory space (step 314 of FIG. 3), the memory space of the thread is decreased by deallocating the portion that it is not needed (step 316 of FIG. 3). Specifically, the size of the ANC stack is decreased whenever less of it is required by the thread during its execution. For instance, if memory is being allocated in 4K byte blocks, when the portion of the ANC stack used by the thread decreases by enough to allow the deallocation of a 4K byte block (i.e., the pointer to the top of the ANC stack points to a location in the preceding 4K block of the ANC stack), then the size of the ANC is decreased by one 4K byte block. This is done by deallocating the ANC memory are a 208 of the ANC stack that is no longer needed. In deallocating this ANC memory area, the execution controller updates the thread storage status table 210 so that the ANC memory area is removed from it and is no longer identified as being part of the ANC stack.

When the thread 200 becomes unexecutable (step 310 of FIG. 3 ), the execution controller 153 adds it to the end of the LRE list 216 (step 318 of FIG. 3). While this thread is still unexecutable (step 320 of FIG. 3), the execution controller determines if any of its memory space is required by another thread (step 322 of FIG. 3). This occurs when, as described earlier, the other thread is created (step 302 of FIG. 3) or needs additional memory space (step 312 of FIG. 3), there is not enough memory space in the uncompressed data repository 120 available for the other thread, and the thread whose memory space is needed is the least recently executed thread in the LRE list 216 that has not yet had its execution data compressed.

If the memory space is needed by another thread, then the execution data of the thread 200 whose memory space is needed is compressed by the data compressor (step 324 of FIG. 3) in the manner discussed earlier (step 308 of FIG. 3). This process (steps 320-324 of FIG. 3) is repeated until the thread becomes executable again (step 320 of FIG. 3).

When the thread 200 becomes executable again, the execution controller 153 determines if the execution data of the thread was compressed (step 326 of FIG. 3). If it was not compressed, then the execution controller removes the thread from the LRE list 216 (step 328 of FIG. 3). As a result, the execution data of the thread will not be compressed until the thread becomes unexecutable again (step 310 of FIG. 3), the thread is added to the LRE list (step 318 of FIG. 3), and the thread's memory space is needed by another thread (step 322 of FIG. 3).

However, when the thread 200 becomes executable again but has its execution data compressed, then the execution controller 153 determines if memory space is available in the uncompressed data repository 120 to decompress the execution data of the thread (step 330 of FIG. 3). This is done in a similar manner to that described earlier for a created thread (step 304 of FIG. 3).

If there is insufficient memory space available for decompressing the execution data of the thread 200, then the execution data of one or more of the least recently executed threads in the LRE list 216 is compressed to make memory space available. This is done in a similar manner to that described earlier (steps 308 and 324 of FIG. 3).

When there is sufficient memory space already available or when sufficient memory space has been made available by compressing the execution data of one or more other threads, the execution controller 153 then allocates the memory space needed for decompressing the execution data of the thread 200 (step 334 of FIG. 3). This is done in a similar manner to that described earlier for a created thread (step 306 of FIG. 3) so that ASC and ANC memory areas 204 and 208 are allocated to form the ASC and ANC stacks of the thread.

The execution data of the thread 200 is then decompressed by the data compressor 146 and placed in the available memory space (step 336 of FIG. 3). Specifically, the execution data in the CD memory areas 218 that were identified in the thread storage status table 210 as being allocated to the thread are decompressed and placed into the corresponding ASC and ANC memory areas 204 and 208 that were allocated by the execution controller 153. In doing this, the data compressor updates program storage status table 210 to identify the pointers to the corresponding ASC and ANC memory areas that form the ASC and ANC stacks of the thread and pointers to the tops of the ASC and ANC stacks. As mentioned previously, the execution data of the thread will not be compressed again until the thread becomes unexecutable again (step 310 of FIG. 3), the thread is added to the LRE list 216 (step 318 of FIG. 3), and the thread's memory space is needed by another thread (step 322 of FIG. 3).

In view of the foregoing, it is clear that the present invention provides a reduction in run-time memory space for execution of threads. However, as those skilled in the art will recognize, other alternative embodiments could be implemented to provide similar benefits.

Specifically, the compression criteria 152 described earlier specified that the least recently executed thread 200 with uncompressed execution data would be compressed when space in the RAM 136 was needed but not available. However, the compression criteria may be selected by the user from a broad range of options and based on a number of conditions specific to the user's client computer system 102. For example, the compression criteria may simply specify that the execution data of each of the threads is to be compressed as soon as the thread becomes unexecutable. Or, it may specify that the execution data of certain threads is to be compressed lazily whenever time is available for doing so. Finally, as an additional variation of any of the foregoing, the compression criteria may specify that only the execution data of threads of a specific size or type are to be compressed.

Moreover, as was stated earlier, the decompression criteria 154 specified that a thread 200 with compressed execution data would have its execution data decompressed by the data compressor 146 as soon as the thread became executable again. However, the decompression criteria could specify that the compressed execution data be decompressed after a predetermined time interval has expired. In this case, the data compressor would include a timer to time the time interval. In one example, this technique could be used for a thread that is being put to sleep for a known time interval so that the execution data of the thread will be compressed for this time interval and then decompressed just prior to when the thread is to be awakened. Or, in another example, the technique could be used for a thread that is waiting for data where the time interval over which the execution data of the thread is compressed would be selected so as to predict when the awaited data will become available for the thread.

Furthermore, as those skilled in the art will recognize, the compression criteria 152 may specify that the execution data that is to be compressed may be the entire execution data of an unexecutable thread 200 or simply a fragment or portion thereof. In this case, the amount of the execution data that is compressed may be based on the memory space required by another thread. Thus, for example, if another thread requires an ANC memory area 208, and there are no more ANC memory areas available, then only the execution data in the needed ANC memory area of the unexecutable thread may be compressed to make this ANC memory area available.

In still another embodiment, each of the ANC memory areas 208 is always allocated as part of the ANC stack of a corresponding thread 200, even though it may not currently store any execution data of the thread. Thus, when one of the ANC memory areas that is allocated to a thread is no longer required by that thread to store execution data, the execution controller 153 still leaves the ANC memory area allocated to the thread. This is done because it may be likely that the thread will again require another ANC memory area at a later time in its execution. In keeping the ANC memory area allocated to this thread, the execution controller updates the thread storage status table 210 to identify the pointer to the top of the ANC stack (which will be in another ANC memory area of the ANC stack). In this way, a virtual free list of available ANC memory areas is created where all of the available ANC memory areas are allocated to threads but contain no execution data. Then, when a thread requires another ANC memory area, the execution controller will re-allocate one of the available ANC memory areas that does not store execution data to this other thread in the same way as described earlier.

Figure 4:
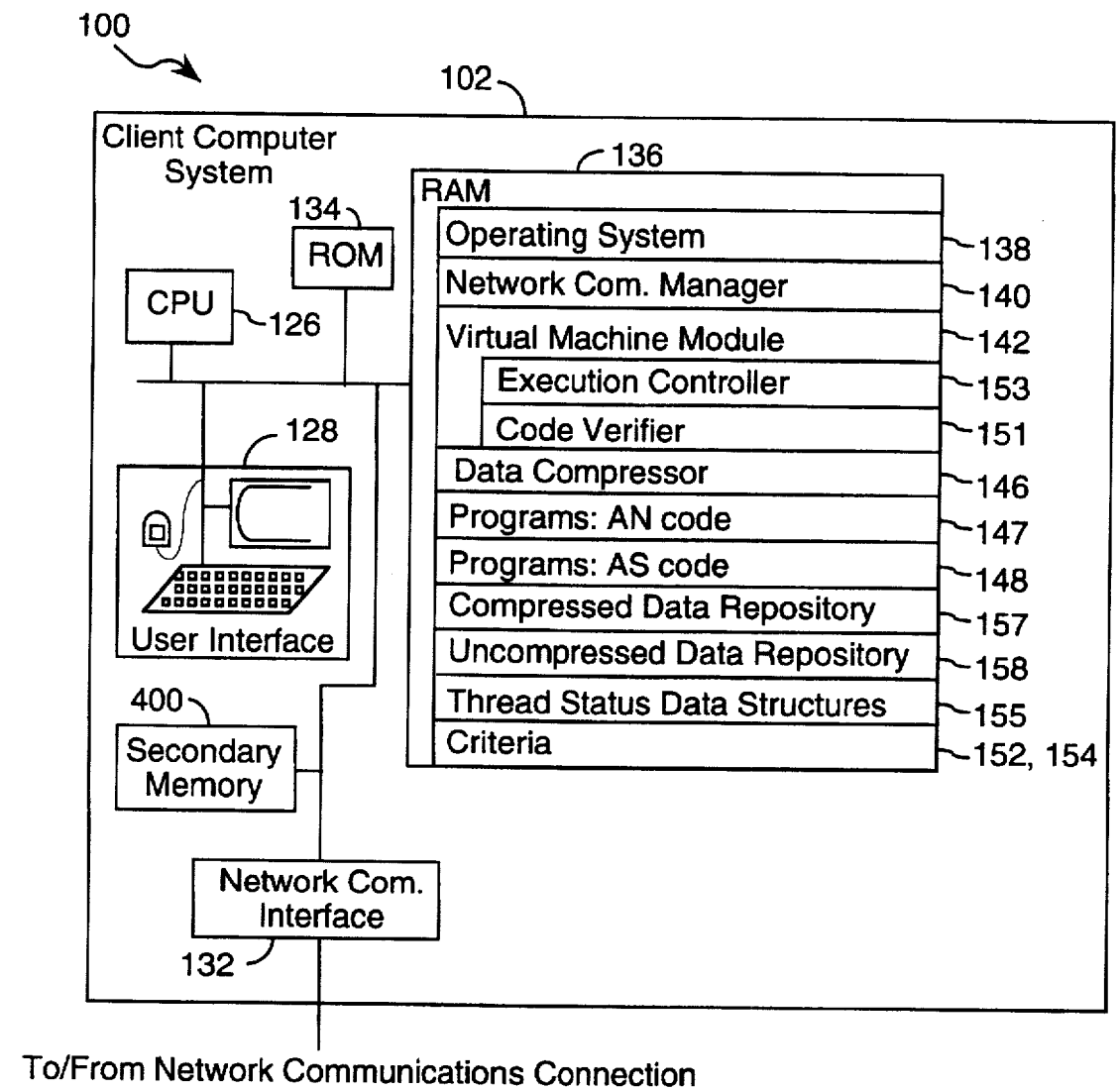
FIG. 4 is a block diagram of an alternative embodiment of a computer network incorporating the present invention.
Figure 5:
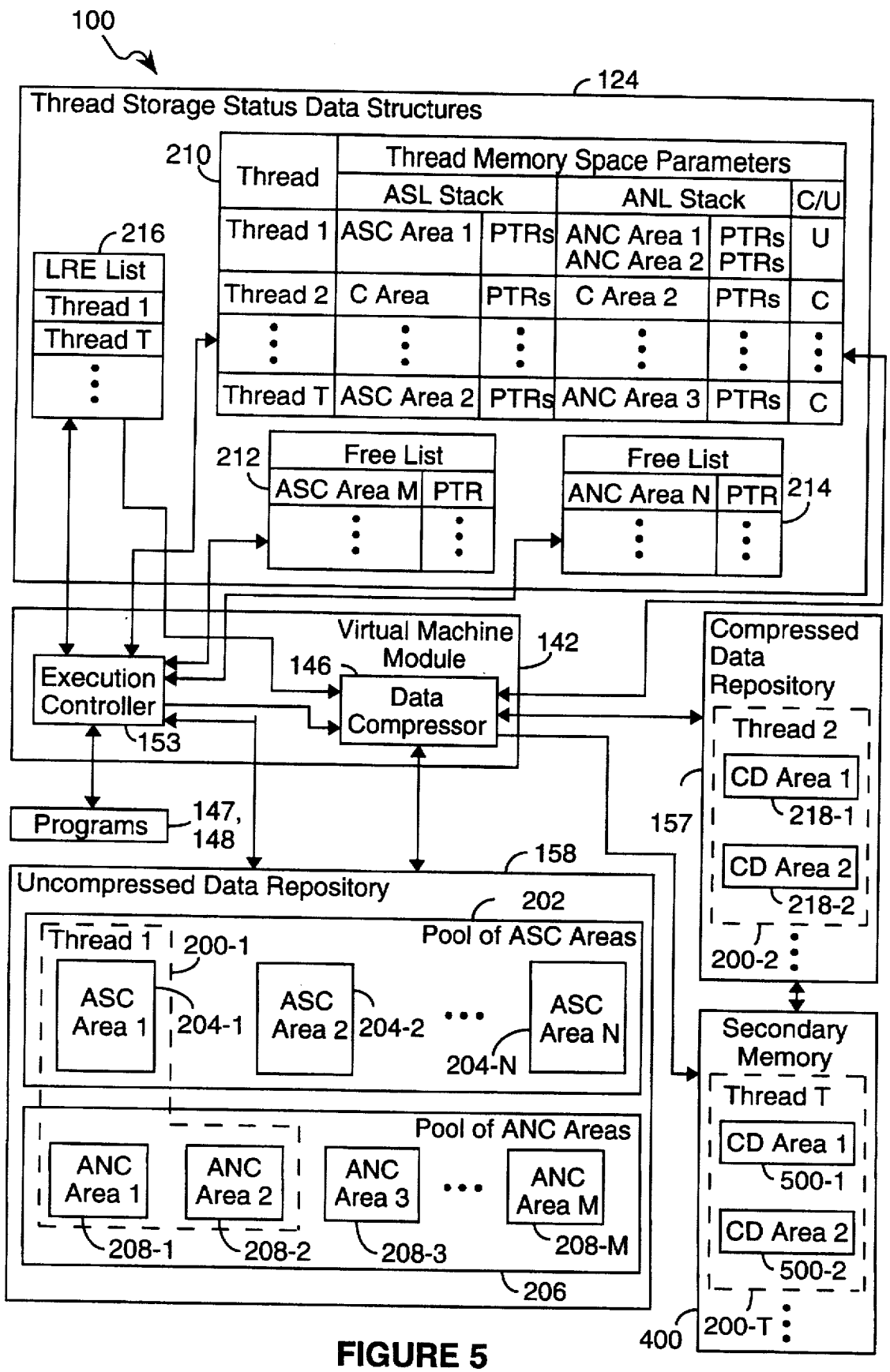
FIG. 5 is a functional block diagram of the operation of a client computer system in the alternative embodiment of the computer network.

Additionally, referring to FIGS. 4 and 5, a secondary memory 400 could be used to store the compressed execution data of threads 200 that are storable because they satisfy secondary storage criteria. In this case, the secondary storage criteria would be included in the compression criteria 152 discussed earlier and could specify that the compressed execution data or a portion thereof is to be stored in the secondary memory at the time that it is compressed or could specify that it is to be stored in the secondary memory only at the time when memory space is needed. In either case, the data compressor 146 moves and stores compressed data stored in the CD memory areas 218 into corresponding CD memory areas 500 in the secondary memory 400. Also, the data compressor updates the pointers in the program storage status table 210 to point to the execution data in the secondary memory. Furthermore, for the threads that are retrievable because their execution data or a portion thereof is compressed, stored in the secondary memory, and is to be decompressed, the execution data would be retrieved from the secondary memory and then decompressed in the RAM 136 in the manner described earlier.

Moreover, in an embodiment where the client computer system 102 includes a secondary memory 400 (e.g. a networked desktop computer), the programs 147 and/or 148 could be downloaded from the server computer systems 104 to the secondary memory. Then, these programs could be loaded by the virtual machine module 142 directly into the RAM 136 from the secondary memory rather then from the server computer systems 104. Additionally, in such an embodiment, the operating system 138, the network communications manager 140, the virtual machine module 142, and the data compressor 146 could be stored in the secondary memory and loaded from there into the RAM.

In still another embodiment, the operating system 138, the network communications manager 140, the virtual machine module 142, and the data compressor 146 could be downloaded from one of the server computer systems 104 into the RAM 136 of the client computer system 102. This would be done in a similar manner as that described earlier for the programs 147 and/or 148 of a server computer system.

In yet another embodiment, the virtual machine module 142 is actually implemented in a silicon chip and serves as the CPU 126 of the client computer system 102. In this case, the programs 147 with AN code are not interpreted for a specific architecture and are instead executed directly. In this embodiment, programs 148 with AS code would not be utilized.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer system for executing a plurality of threads of execution of a program with reduced run-time memory space requirements, the computer system comprising:

a run-time memory in which the program is loaded;

an execution controller that (A) executes the threads, whereby each of the threads is executable and unexecutable at different times, and (B) stores into available space in the run-time memory execution data of each of the threads when the execution data is generated; and a data compressor that (A) compresses in the run-time memory the execution data or a portion thereof of a selected thread of the threads when the selected thread is unexecutable and the execution data or portion thereof of the selected thread is not compressed, whereby available space is made in the run-time memory, and (B) decompresses into available space in the run-time memory the compressed execution data or portion thereof of the selected thread so that the selected thread may be executed when the selected thread is executable.

2. The computer system of claim 1 wherein the data compressor decompresses the compressed execution data or portion thereof of the selected thread as soon as the the selected thread becomes executable.

3. The computer system of claim 1 wherein the data compressor decompresses the compressed execution data or portion thereof of the selected thread after a predetermined time interval after the selected thread has become unexecutable.

4. The computer system of claim 1 wherein the data compressor compresses the execution data or portion thereof of the selected thread as soon as the selected thread becomes unexecutable.

5. The computer system of claim 1 wherein the data compressor compresses the execution data or portion thereof of the selected thread further when space in the run-time memory is needed but not available.

6. The computer system of claim 5 further comprising:

a least recently executed list that lists those of the threads that are currently unexecutable in order of least recently executed thread to most recently executed thread;

the selected thread is the least recently executed thread in the least recently executed list whose execution data or portion thereof is not compressed when space in the run-time memory is needed but not available.

7. The computer system of claim 1 wherein the run-time memory is a random access memory.

8. The computer system of claim 1 further comprising:

a secondary memory;

the data compressor (A) stores in the secondary memory the compressed execution data or portion thereof of the selected thread when further space in the run-time memory is needed but not available, and (B) retrieves from the secondary memory the compressed execution data or portion thereof of the selected thread when the compressed execution data or portion thereof of the selected thread is to be decompressed in the run-time memory.

9. The computer system of claim 1 further comprising:

a network interface that receives the program from a computer network in architectural neutral code that is independent of the computer system's specific architecture;

a network communications manager that loads the received architectural neutral code of the program into the run-time memory; and a virtual machine module that (A) includes the execution controller, (B) runs on the computer system, and (C) enables execution of the threads in the architectural neutral code of the program.

10. A method of executing a plurality of threads of execution of a program with reduced run-time memory space requirements, the method comprising the steps of:

loading the program into a run-time memory of the computer system;

executing the threads, whereby the threads are executable and unexecutable at different times;

storing into available space in a run-time memory of the computer system execution data of each of the threads when the execution data is generated;

compressing in the run-time memory the execution data or a portion thereof of a selected thread of the threads when the selected thread is unexecutable and the execution data or portion thereof of the selected thread is not compressed, whereby available space is made in the run-time memory; and decompressing into available space in the run-time memory the compressed execution data or portion thereof of the selected thread so that the selected thread may be executed when the selected thread is executable.

11. The method of claim 10 wherein the decompressing step includes decompressing the compressed execution data or portion thereof of the selected thread as soon as the selected thread becomes executable.

12. The method of claim 10 wherein the decompressing step includes decompressing the compressed execution data or portion thereof of the selected thread after a predetermined time interval.

13. The method of claim 10 wherein the compressing step includes compressing the execution data or portion thereof the selected thread as soon as the selected thread becomes unexecutable.

14. The method of claim 10 wherein the compressing step includes compressing the execution data or portion thereof the selected thread further when space in the run-time memory is needed but not available.

15. The method of claim 13 further comprising the steps of:

providing a least recently executed list that lists those of the threads that are currently unexecutable in order of least recently executed thread to most recently executed thread;

the selected thread is the least recently executed thread in the least recently executed list whose execution data or portion thereof is not compressed when space in the run-time memory is needed but not available.

16. The method of claim 9 wherein the run-time memory is a random access memory.

17. The method of claim 9 further comprising the steps of:

storing in a secondary memory of the computer system the compressed execution data or portion thereof of the selected thread when further space in the run-time memory is needed but not available; and retrieving from the secondary memory the compressed execution data or portion thereof of the selected thread when the compressed execution data or portion thereof of the selected thread is to be decompressed in the run-time memory.

18. The method of claim 10 further comprising the steps of:

receiving the program from a computer network in architectural neutral code that is independent of the computer system's specific architecture;

the loading step includes loading the received architectural neutral code of the program into the run-time memory; and using a virtual machine module that runs on thee computer system to enable execution of the threads in the architectural neutral code of the program.

19. A computer readable memory for use with a computer system that executes a plurality of threads of execution of a program, the program being loaded into a run-time memory of the computer system, the computer readable memory comprising:

an execution controller that (A) controls execution of the threads, whereby the threads are executable and unexecutable at different times, and (B) stores into available space in a run-time memory of the computer system execution data of each of the threads when the execution data is generated; and a data compressor that (A) compresses in the run-time memory the execution data or a portion thereof of a selected thread of the threads when the selected thread is unexecutable, whereby available space is made in the run-time memory, and (B) decompresses into available space in the run-time memory the compressed execution data or portion thereof of the selected thread so that the selected thread may be executed when the selected thread is executable.

20. The computer readable memory of claim 19 wherein the data compressor decompresses the compressed execution data or portion thereof of the selected thread as soon as the selected thread becomes executable.

21. The computer readable memory of claim 19 wherein the data compressor decompresses the compressed execution data or portion thereof of the selected thread after a predetermined time interval.

22. The computer readable memory of claim 19 wherein the data compressor compresses the execution data or portion thereof of the selected thread as soon as the selected thread becomes unexecutable.

23. The computer readable memory of claim 19 wherein the data compressor compresses the execution data or portion thereof of the selected thread further when space in the run-time memory is needed but not available.

24. The computer readable memory of claim 23 further comprising:

a least recently executed list that lists those of the threads that are currently unexecutable in order of least recently executed thread to most recently executed thread;

the selected thread is the least recently executed thread in the least recently executed list whose execution data or portion thereof is not compressed when space in the run-time memory is needed but not available.

25. The computer readable memory of claim 19 wherein the run-time memory is a random access memory.

26. The computer readable memory of claim 19 wherein the data compressor (A) stores in a secondary memory the compressed execution data or portion thereof of the selected thread in a secondary memory of the computer system when further space in the run-time memory is needed but not available, and (B) retrieves the compressed execution data or portion thereof of the selected thread from the secondary memory when the compressed execution data or portion thereof of the selected thread is to be decompressed in the run-time memory.

27. The computer readable memory of claim 19 further comprising:

a network communications manager that loads architectural neutral code of the program into the run-time memory, the architectural neutral code of the program being independent of the computer system's specific architecture and received by the computer system from a computer network;

a virtual machine module that (A) includes the execution controller, (B) runs on the computer system, and (C) enables execution of the threads in the architectural neutral code of the program.

* * * * *